US005803681A

United States Patent [19]
Landwerlen

[11] Patent Number: 5,803,681
[45] Date of Patent: Sep. 8, 1998

[54] HANDLE RETAINER FOR MILLING MACHINES

[75] Inventor: Joseph E. Landwerlen, Shelbyville, Ind.

[73] Assignee: J&L Tool & Machine, Inc., Shelbyville, Ind.

[21] Appl. No.: 877,666

[22] Filed: Jun. 18, 1997

[51] Int. Cl.$^6$ .............................. B23C 9/00; B23Q 11/00; F16H 27/00; G05G 5/00

[52] U.S. Cl. .................. 409/134; 16/114 R; 16/DIG. 41; 74/548; 403/341; 408/241 R

[58] Field of Search .............................. 409/64, 134, 218, 409/185; 408/135, 241 R; 16/DIG. 24, 41, 114 R; 82/905, 173, 141; 74/548, 557, 556, 558, 558.5, 543; 403/339, 341, 315

[56] References Cited

U.S. PATENT DOCUMENTS

| | | | |
|---|---|---|---|
| 2,447,574 | 8/1948 | Gibbons | 74/548 X |
| 2,452,742 | 11/1948 | Franzene | 74/548 |
| 3,026,742 | 3/1962 | Bruno | 403/315 X |
| 3,771,385 | 11/1973 | Benoit et al. | 74/547 |
| 3,783,720 | 1/1974 | Dean | 82/154 X |
| 3,821,904 | 7/1974 | Fowler | 408/135 |
| 4,456,219 | 6/1984 | Scott et al. | 74/526 X |
| 5,470,181 | 11/1995 | Garcia | 409/134 |
| 5,655,858 | 8/1997 | Cukelu | 409/185 |

FOREIGN PATENT DOCUMENTS

| | | | |
|---|---|---|---|
| 2580344 | 10/1986 | France | 16/DIG. 41 |

*Primary Examiner*—William R. Briggs
*Attorney, Agent, or Firm*—Woodard, Emhardt, Naughton Moriarty & McNett

[57] ABSTRACT

A handle retainer includes a generally cylindrical, hollow body with first and second ends. The first end is C-shaped and defines a central opening. The second end is closed. The retainer is useful for mounting over a handle and receiver assembly in which the receiver is mounted on a shaft and the handle and receiver include mutually facing projections and recesses which are interlocked in the coupled condition. The C-shaped first end of the retainer is received behind the handle receiver with the shaft being positioned within the central opening, while the closed second end is received against a head of the handle. The retainer preferably includes a recess for receiving the handle head in a snap fit fashion.

5 Claims, 4 Drawing Sheets

HANDLE RETAINER FOR MILLING MACHINES

FIELD OF THE INVENTION

The present invention relates to the field of machines having removable handles, and particularly to a device to retain the handle on such machines.

DESCRIPTION OF THE PRIOR ART

Various types of machines are known in the art which include handles for varying the position of portions of the machine or for other purposes. Milling machines, for example, have a table which may need to be raised or lowered relative to other parts of the machine. A crank handle is typically provided which can be turned to move the table vertically.

Occasionally a handle of this type is provided which uses an interlocking arrangement that facilitates placing the handle in various rotational positions. A common connection comprises simple interlocking teeth, one set being on the handle and the other being on the receptacle to which the handle is connected. For such arrangements, it is desirable to have a means by which the handle can be conveniently retained in the interlocking position once the handle has been positioned as desired.

An example of the foregoing arrangement is found in the Bridgeport Milling Machine. The Bridgeport machines are well known and commonly used in the art. The Bridgeport Milling Machines include a handle for raising and lowering the table, which handle connection includes interlocking teeth. However, the handle is susceptible to separating from the interlocking teeth and there is a need to provide an improved means for maintaining the handle in its proper connection.

SUMMARY OF THE INVENTION

Briefly describing one aspect of the present invention, there is provided a handle retainer for maintaining the coupling of a handle to a handle receiver. The retainer comprises a cylindrical body that has a C-shaped first end for reception over a shaft behind the receiver and a closed second end receivable against the head of the handle. The retainer is sized to provide a friction fit over the receiver and handle to maintain them in a coupled condition.

It is an object of the present invention to provide a handle retainer which assures securement of a handle to a receiver in interlocking, coupled condition. A further object of the present invention is to provide a retainer for a handle which is simple and inexpensive in design, and easily installed and removed. Further objects and advantages of the present invention will be apparent from the description of the preferred embodiment which follows.

DESCRIPTION OF THE PREFERRED EMBODIMENT

For the purposes of promoting an understanding of the principles of the invention, reference will now be made to the embodiment illustrated herein and specific language will be used to describe the same. It will nevertheless be understood that no limitation of the scope of the invention is thereby intended, such alterations and further modifications, and such further applications of the principles of the invention being contemplated as would normally occur to one skilled in the art to which the invention relates.

The present invention provides a handle retainer which is simple and easy to install, and which assures the coupling of a handle to a receiver. The retainer is demonstrated in its use with a variety of devices, and is described herein in connection with a typical embodiment for a Bridgeport Milling Machine. It will be appreciated that the handle retainer of the present invention finds equal application in other settings comparable to the one disclosed herein, which is simply given by way of example.

Figure 1:
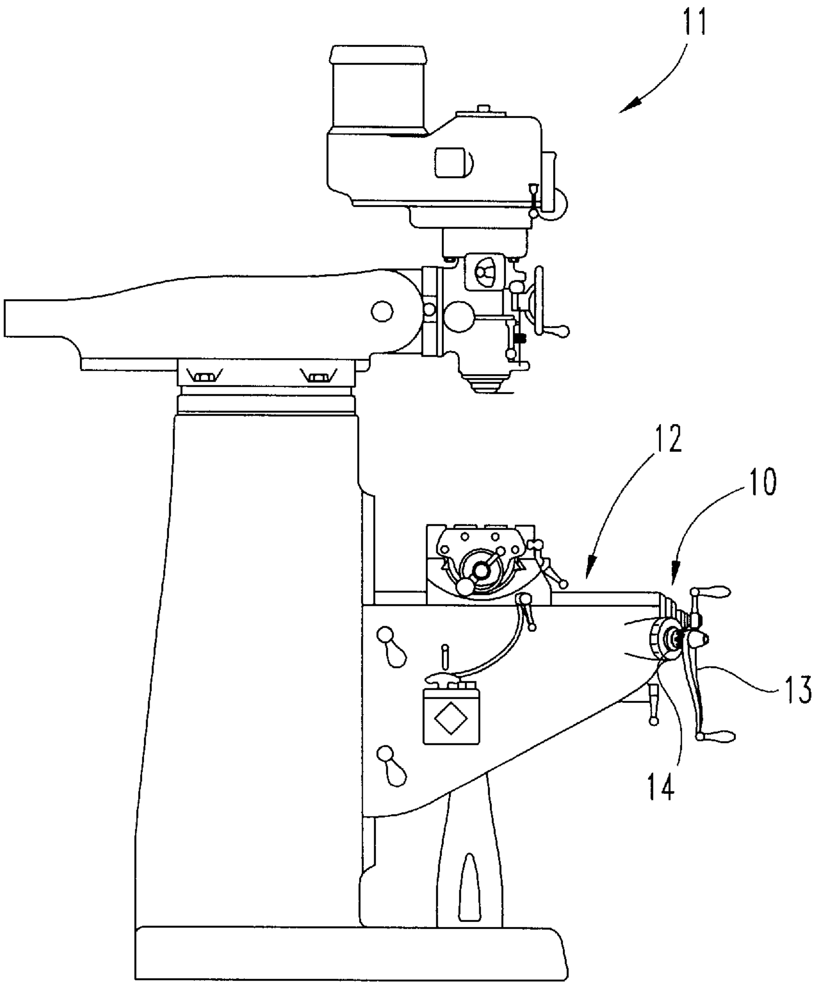
FIG. 1 is a side, elevational view of a Bridgeport Milling Machine including a handle employing an interlocking teeth engagement.
Figure 2:
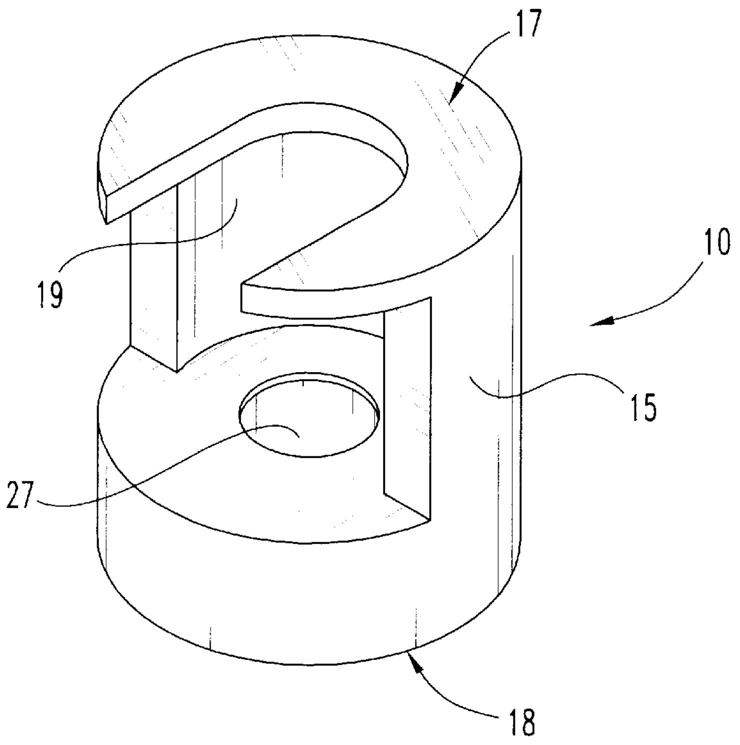
FIG. 2 is a perspective view of a handle retainer in accordance with the present invention.
Figure 3:
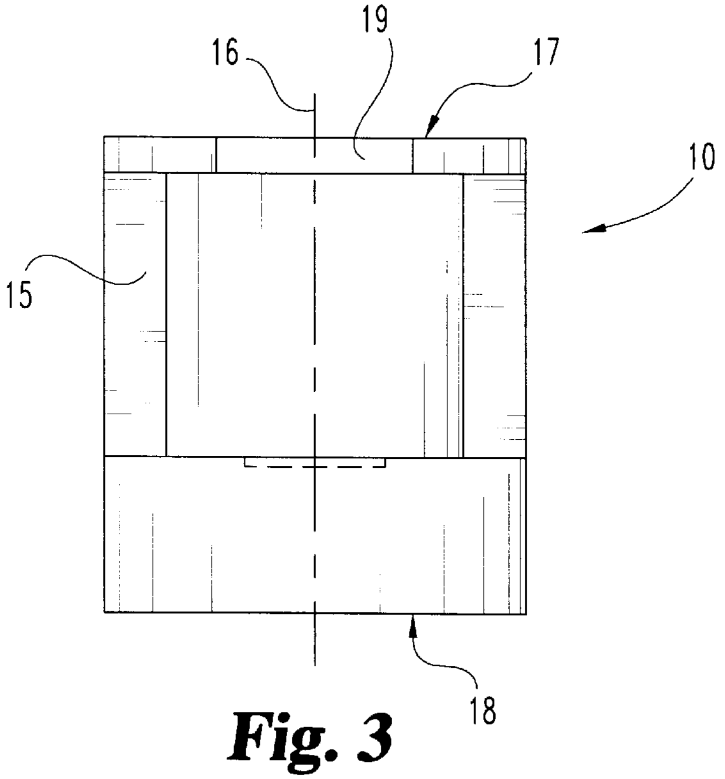
FIG. 3 is a front, elevational view of the handle retainer of FIG. 2.
Figure 4:
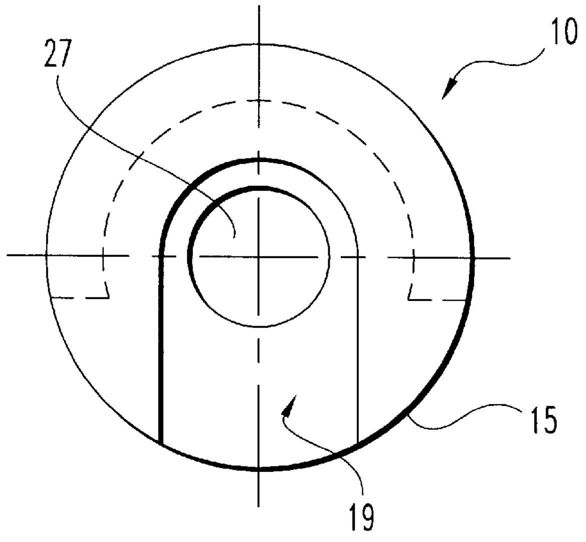
FIG. 4 is a top, plan view of the handle retainer.
Figure 5:
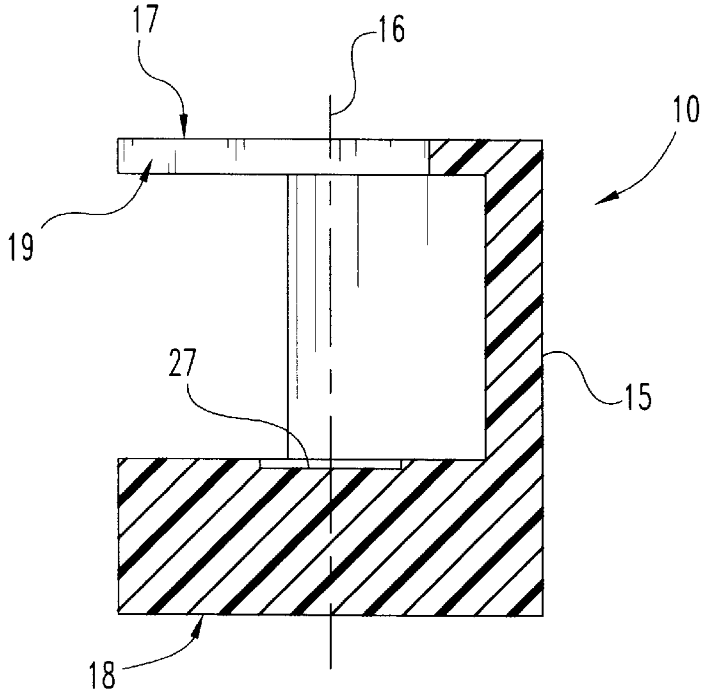
FIG. 5 is a side, cross-sectional view of the handle retainer, taken along the line 5—5 in FIG. 4 looking in the direction of the arrows.

Referring in particular to the drawings, there is shown a handle retainer 10 constructed in accordance with the present invention. The retainer 10 is shown in FIG. 1 in use with a Bridgeport Milling Machine 11, which includes various known components which form no part of the present invention and therefore are not further detailed herein. In pertinent part, the Machine 11 includes a table 12 which is adjustable in position by operation of a handle 13 coupled with a receiver 14. As is further described hereafter, the receiver and handle include interdigitating fingers, i.e., recesses and projections, which provide for the coupling of the handle with the receiver. The handle retainer provides a quick and sure means to fix the handle in a coupled condition with the receiver.

A preferred configuration of the retainer 10 is shown in detail in FIGS. 2–5. The retainer comprises a generally hollow body 15 having a central axis 16. The body includes first and second ends 17 and 18, respectively. The first end 17 is C-shaped with a central opening 19. The second end 18 is closed.

Figure 6A:
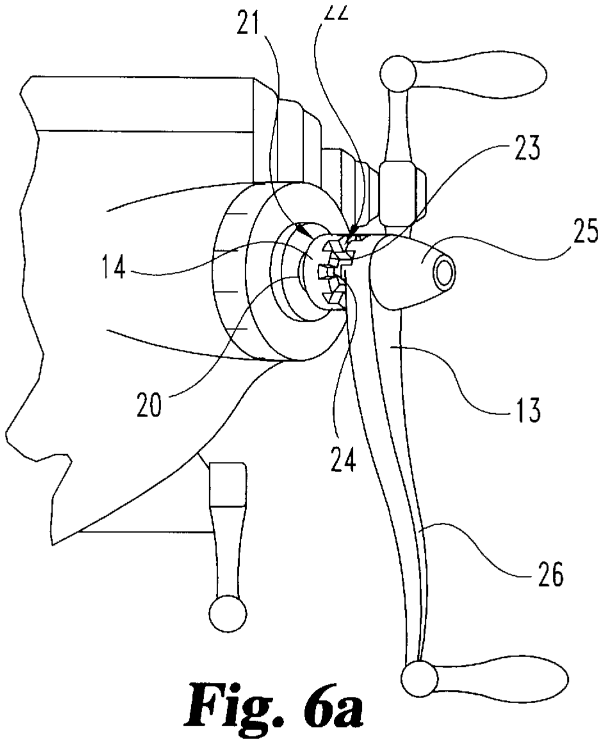
FIG. 6*a* is a perspective view showing the handle and receiver assembly of a Bridgeport Milling Machine in greater detail.

Referring to FIG. 6*a*, there is shown in greater detail the coupling of the handle 13 with the receiver 14. The receiver 14 is mounted to a shaft 20. The receiver includes first and second sides 21 and 22, respectively. First side 21 is generally flat, while second side 22 defines a plurality of axially extending projections 23 and recesses 24. The handle 13 includes a head 25 and a lever 26. The head defines a plurality of axially extending recesses and projections complementary to the projections and recesses of the receiver. The head and receiver therefore have a coupled condition with the complementary projections and recesses interlocking in conventional fashion.

A problem in the prior art has been the ability of a handle such as the one shown in the Figures coming separated from the receiver by moving axially away from the receiver. For example, the mere manipulation, i.e., turning, of the handle may allow the handle to move axially and become disengaged. Similarly, operation of the milling machine can readily cause vibrations which will tend to dislodge the handle from the receiver. The separation of the handle from the coupled condition, particularly if it results in the handle falling from the machine, can be a source of considerable irritation.

Figure 6B:
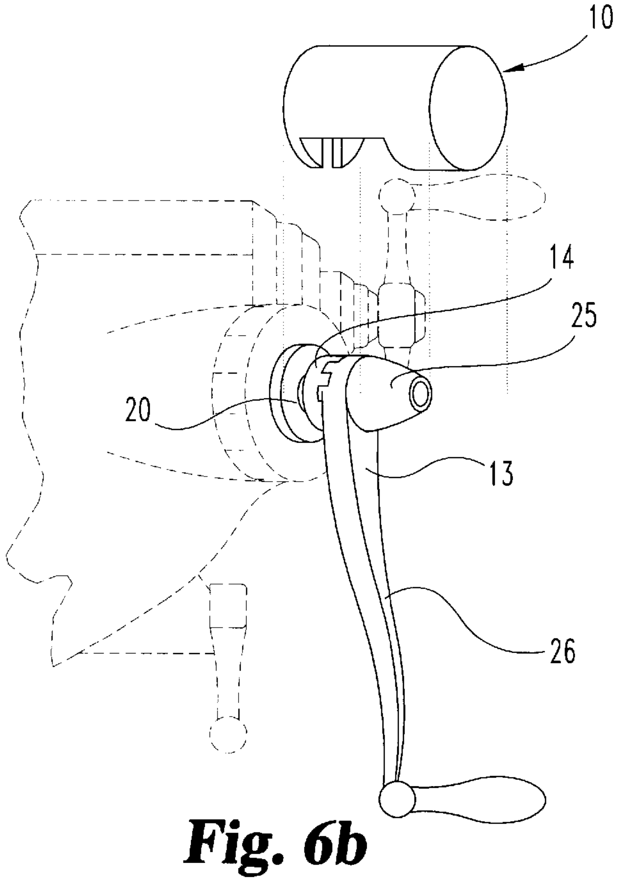
FIG. 6*b* is an exploded view depicting the mounting of the handle retainer in position on a handle and complementary receiver to maintain the interlocking projections and recesses in coupled condition.

The present invention provides an elegant solution to this persistent problem by means of a simple, inexpensive and easy to use retainer that readily mounts to the handle and receiver assembly. As demonstrated in an exploded view in FIG. 6*b*, the retainer 10 fits over the handle and receiver when in the coupled condition and retains them in place. The receiver and handle head are received within the generally hollow body 15 of the handle retainer 10 between the first and second ends. The first end of the retainer is received adjacent the first side 21 of the receiver, with the shaft 20 being positioned within the C-shaped, central opening.

The second end 18 of the handle retainer 10 includes a surface 27 which is received against a portion of the handle head 25. As shown in the drawings, the surface 27 is preferably recessed slightly to provide for a snap fit over the handle head. Alternatively, the surface 27 may simply be positioned sufficiently close to the opposite end of the retainer that a suitable friction fit of the retainer is achieved. As will be readily appreciated, the describe design for a handle retainer will readily maintain the handle in coupled condition with the receiver, with the complementary projections and recesses interlocked.

The handle retainer of the present invention may be fabricated from a wide variety of materials. For example, plastics, rubber or various metals such as aluminum are well suited to use for the retainer.

What is claimed is:

1. A retainer for a rotatable coupling of a handle and a receiver, the receiver having first and second sides and being mounted on a shaft, the second side defining a plurality of axially extending projections and recesses, the handle including a head and a lever, the head having a plurality of axially extending recesses and projections complementary to the projections and recesses of the receiver, the head and the receiver in the coupled condition having the complementary projections and recesses interlocking, said retainer comprising:

a generally hollow body having a central axis and including first and second ends, the first end being C-shaped with a central opening, the first end being receivable adjacent the first side of the receiver and about the shaft on which the receiver is mounted with the shaft being received within the central opening, the second end being closed and having a surface receivable against the head of the handle when the handle is in the coupled condition, said retainer being positionable over the coupled receiver and handle head to maintain the complementary projections and recesses in interlocking condition.

2. The retainer of claim 1 in which the handle and receiver are part of a milling machine.

3. The retainer of claim 1 in which said body is cylindrical in shape.

4. The retainer of claim 1 in which the surface of the second end of said body includes a recess for reception of the head of the handle.

5. The retainer of claim 1 in which the first and second ends are positioned to provide a friction fit of said retainer over the receiver and handle in the coupled condition.

* * * * *